United States Patent
Kazayama

(10) Patent No.: US 11,238,268 B2
(45) Date of Patent: Feb. 1, 2022

(54) IMAGE PROCESSING DEVICE, IMAGE PROCESSING METHOD, AND PATHOLOGICAL DIAGNOSIS ASSISTANCE SYSTEM USING SAME

(71) Applicant: Konica Minolta, Inc., Tokyo (JP)

(72) Inventor: Yuki Kazayama, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/615,311

(22) PCT Filed: May 24, 2018

(86) PCT No.: PCT/JP2018/020042
§ 371 (c)(1),
(2) Date: Nov. 20, 2019

(87) PCT Pub. No.: WO2019/008935
PCT Pub. Date: Jan. 10, 2019

(65) Prior Publication Data
US 2020/0134286 A1    Apr. 30, 2020

(30) Foreign Application Priority Data
Jul. 5, 2017 (JP) .............................. JP2017-131770

(51) Int. Cl.
*G06K 9/00* (2006.01)
*G06T 7/00* (2017.01)

(52) U.S. Cl.
CPC .......... *G06K 9/0014* (2013.01); *G06T 7/0012* (2013.01); *G06T 2207/10056* (2013.01); *G06T 2207/30024* (2013.01)

(58) Field of Classification Search
CPC ................ G06K 9/0014; G06T 7/0012; G06T 2207/10056; G06T 2207/30024
(Continued)

(56) References Cited

U.S. PATENT DOCUMENTS 10,094,767 B2 * 10/2018 Ikuyama ............ G01N 21/6458
2009/0087051 A1    4/2009 Soenksen et al.
(Continued)

FOREIGN PATENT DOCUMENTS

| JP | 2009151350 A | * | 7/2009 | |
| JP | 2014002166 A | | 1/2014 | |
| WO | WO-2018131091 A1 | * | 7/2018 | ........... G02B 26/008 |

OTHER PUBLICATIONS

EPO, Extended European Search Report for the corresponding European patent application No. 18828829.4, dated Apr. 23, 2020.
(Continued)

*Primary Examiner* — Vu Le
*Assistant Examiner* — Winta Gebreslassie
(74) *Attorney, Agent, or Firm* — Lucas & Mercanti, LLP

(57) ABSTRACT

An image processing device and an image processing method capable of clarifying a specific region, especially a stained region of the cell nucleus, by correcting in consideration of overlap of staining, thereby making discrimination easy, and a pathological diagnosis assistance system using the same are provided. A pathological stained image is decomposed into dye concentration images of respective dyes, dye information on the respective staining dyes are correlated, and the respective dye concentration images are corrected to emphasize a specific region.

20 Claims, 4 Drawing Sheets

(58) Field of Classification Search
USPC .......................................................... 382/133
See application file for complete search history.

(56) References Cited

U.S. PATENT DOCUMENTS

2011/0026803 A1    2/2011  Can et al.
2019/0325577 A1*  10/2019  Kaneko .............. G02B 21/0008

OTHER PUBLICATIONS

International Search Report dated Aug. 21, 2018 for PCT/JP2018/020042 and English translation.

* cited by examiner

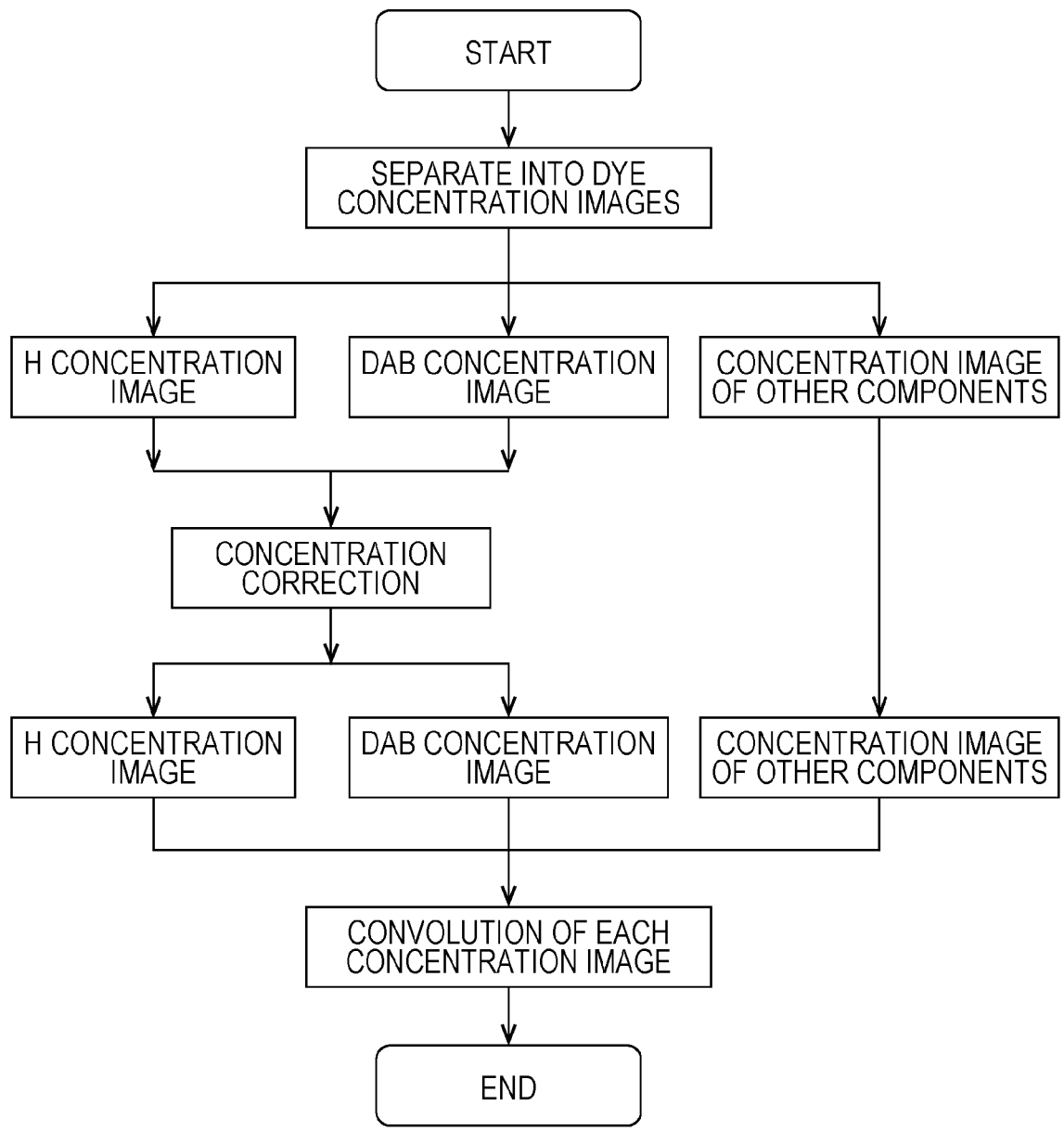

IMAGE PROCESSING DEVICE, IMAGE PROCESSING METHOD, AND PATHOLOGICAL DIAGNOSIS ASSISTANCE SYSTEM USING SAME

CROSS REFERENCE TO RELATED APPLICATION

This Application is a 371 of PCT/JP2018/020042 filed on May 24, 2018, which, in turn, claimed the priority of Japanese Patent Application No. 2017-131770 filed on Jul. 5, 2017, both applications are incorporated herein by reference.

TECHNICAL FIELD

The present invention relates to an image processing device and an image processing method capable of emphasizing a specific region to be observed in a pathological stained image, and a pathological diagnosis assistance system capable of extracting the specific region in the pathological stained image using the same.

BACKGROUND ART

Conventionally, in pathological diagnosis, a specimen collected from a patient is observed by a specialist such as a pathologist or a clinical laboratory technologist with a microscope or the like to obtain a guideline for selection of a therapeutic drug or a treatment policy. In such observation, generally, the specimen is stained using a plurality of dyes.

For example, in diagnosis of breast cancer, hematoxylin which selectively stains the cell nucleus and diaminobenzidine (DAB) designed to selectively stain specific proteins closely associated with breast cancer prognosis prediction are combined to stain.

In such pathological diagnosis, in recent years, deep learning which is a kind of machine learning realized by developing a neural network is increasingly applied to pathological diagnosis image analysis.

In such pathological diagnosis, as described above, staining is performed with a plurality of dyes, so that, at the time of presentation of an image of a specimen obtained by an imaging element to an observer, or at the time of learning of a classifier in a machine learning method, it is often decomposed to concentration images of respective dyes using a dye base, and the decomposed image is often corrected to be used.

For example, Patent Literature 1 discloses a display method of a digital slide image in which a method of decomposing a captured image into dye concentration images corresponding to respective staining dyes and presenting the same as a single-stained image, or a method of performing a digital emphasizing process for the respective staining dyes and then recombining to present are disclosed.

Note that decomposition (color deconvolution) into the dye concentration images is to perform following arithmetic operation for each pixel of the captured image.

When a matrix consisting of dye bases representing dye-specific absorption contribution to respective channels of RGB of the imaging element is represented by M, a vector C representing an amount of dye contained in a pixel of interest may be estimated based on following equation (A) from a vector y obtained by arranging RGB values converted to an optical concentration (OD).

$$C = M^{-1}[y] \quad \text{[Equation 1]}$$

$M^{-1}$ represents an inverse matrix of M. This equation is derived from the Lambert-Beer law which formulates absorption of light by a substance as in following equation (B).

$$I = I_0 \exp(-Ac) \quad \text{[Equation 2]}$$

Herein, $I_0$ and $I$ represent intensity of incident light and light intensity after passing through the substance, respectively. A and c represent the amount of dye and an absorption coefficient per unit, respectively.

CITATION LIST

Patent Literature

Patent Literature 1: JP 2014-002166 A

SUMMARY OF INVENTION

Technical Problem

However, in the conventional method, although conversion into a concentration image corresponding to each staining dye and correction for each dye concentration image are taken into consideration, correction in consideration of overlap of dyes are not performed.

For example, in a case where the cell nucleus is stained with hematoxylin (H) and at least one of the cytoplasm or cell membrane is stained with diaminobenzidine (DAB), and the DAB-positive cell nucleus is measured, a DAB-stained region (region stained with DAB) overlaps with an H-stained region (region stained with hematoxylin) in various patterns.

This is partly because actual specimen tissue has a three-dimensionally wide spatial structure, whereas an observed specimen is a fragment obtained by slicing the same. In other words, depending on a site where the cell is cut, there is variation in the manner in which at least one stained region of the cytoplasm or cell membrane overlaps with the stained region of the cell nucleus. As a result, in a case where an observer such as a pathologist determines the DAB-positive cell nucleus by image diagnosis, or at the time of learning of a classifier by a machine learning method, there is a problem that the cell nucleus, that is, the H-stained region is discriminated with difficulties in a region where DAB staining is intense.

An object of the present invention is to provide an image processing device and an image processing method capable of clarifying a specific region, especially a stained region of the cell nucleus, by performing correction in consideration of overlap of staining on a captured image, thereby making discrimination easy, and a pathological diagnosis assistance system using the same.

Solution to Problem

The present invention is achieved in order to solve the above-described problem in the conventional technology, and in order to realize at least one of the above-described objects, an image processing device reflecting one aspect of the present invention is an image processing device which emphasizes a specific region in a pathological stained image, provided with:

a dye concentration image generating module which decomposes the pathological stained image into dye concentration images of respective staining dyes; and a dye concentration image correcting module which performs image processing for emphasizing the specific region by using each of the dye concentration images, in which the dye concentration image correcting module corrects each of the dye concentration images by correlating dye information of the respective staining dyes.

A pathological diagnosis assistance system reflecting one aspect of the present invention is provided with:

a specimen staining means which stains a specimen to be diagnosed;

an imaging means which captures a pathological stained image of the stained specimen; and the image processing device.

An image processing method reflecting one aspect of the present invention is an image processing method of emphasizing a specific region in a pathological stained image, provided with:

a dye concentration image generating step of decomposing the pathological stained image into dye concentration images of respective staining dyes; and a dye concentration image correcting step of performing image processing for emphasizing the specific region by using each of the dye concentration images, in which the dye concentration image correcting step corrects each of the dye concentration images by correlating dye information of the respective staining dyes.

Advantageous Effects of Invention

According to the present invention, for a specific region to be observed in a pathological stained image, it is possible to amplify information on a dye which stains the specific region or eliminate information on a dye which stains a region other than the specific region by performing correction in consideration of overlap of staining, thereby clarifying the staining of the specific region and improving legibility of an observer.

BRIEF DESCRIPTION OF DRAWINGS

FIG. 3 is a flowchart illustrating a flow of image processing in the image processing device illustrated in FIG. 2.

DESCRIPTION OF EMBODIMENTS

Hereinafter, embodiments (embodiments) of the present invention are described in further detail with reference to the drawings.

Figure 1:
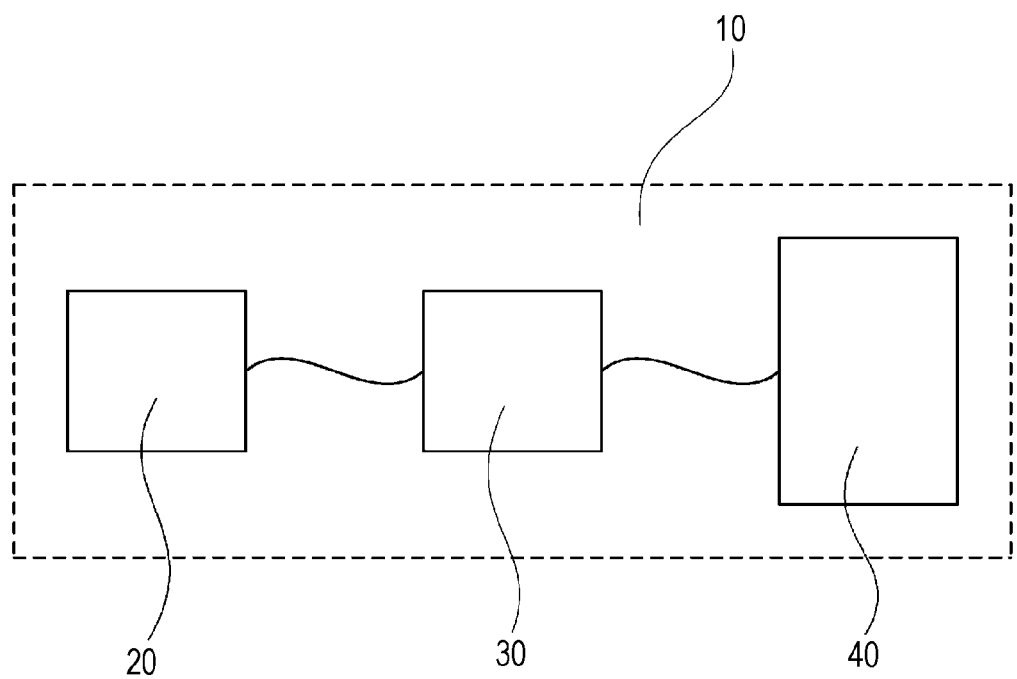
FIG. 1 is a block diagram illustrating a configuration of a pathological diagnosis assistance system according to an embodiment of the present invention.
Figure 2:
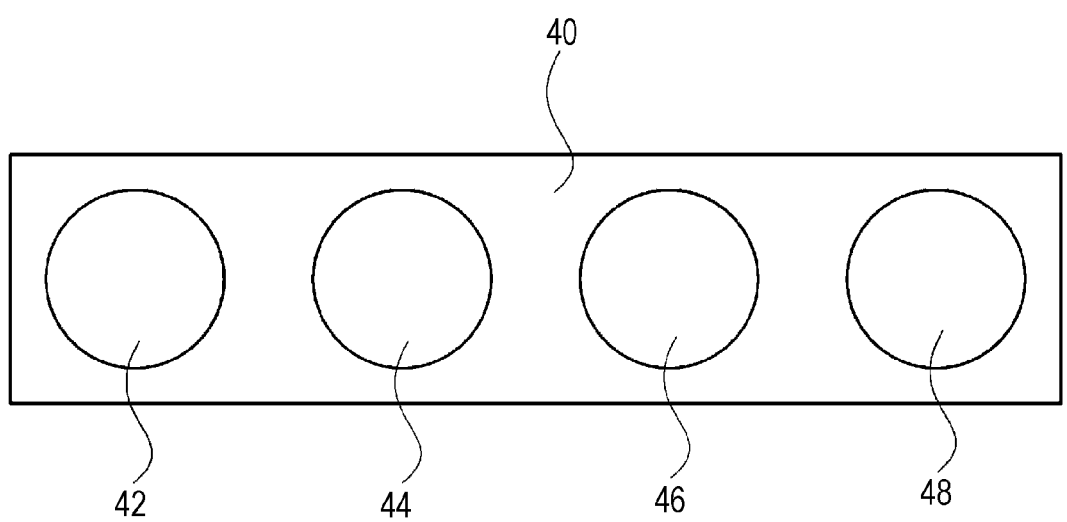
FIG. 2 is a block diagram illustrating a configuration of an image processing device illustrated in FIG. 1.

FIG. 1 is a block diagram illustrating a configuration of a pathological diagnosis assistance system according to an embodiment of the present invention, FIG. 2 is a block diagram illustrating a configuration of an image processing device illustrated in FIG. 1, and FIG. 3 is a flowchart illustrating a flow of image processing in the image processing device illustrated in FIG. 2.

As illustrated in FIG. 1, a pathological diagnosis assistance system 10 of this embodiment is provided with a specimen staining means 20 which stains a specimen to be diagnosed, an imaging means 30 which captures a pathological stained image of the stained specimen, and an image processing device 40 which analyzes the captured pathological stained image.

The specimen staining means 20 is a means for staining each of a plurality of stained regions of the specimen. The specimen staining means 20 may be an existing automatic staining device or may be a kit including a reagent for staining cells.

Note that, in this embodiment, the cell nucleus serves as a first stained region, and hematoxylin (H) is used as a first staining dye for staining the same. The cytoplasm and cell membrane serve as a second stained region, and diaminobenzidine (DAB) is used as a second staining dye for staining the same.

The plurality of stained regions may be appropriately set, and the staining dye is not especially limited as long as this may selectively stain the set stained region.

Note that, as the reagent for staining the cell nucleus, in addition to hematoxylin (H), for example, Kernechtrot, methyl green or the like may be used.

As the reagent for staining at least one of the cytoplasm or cell membrane, in addition to diaminobenzidine (DAB), for example, HistoGreen or the like may be used.

The imaging means 30 is a means for capturing the pathological stained image of the stained specimen. As the imaging means 30, a digital camera, a digital slide scanner or the like is preferably used because this passes the pathological stained image to the image processing device 40 to be described later. Note that a microscope, a low-pass filter for reducing noise or the like may be included as necessary.

Note that, when the pathological stained image is captured by the imaging means 30, it is preferable to perform white balance correction in advance in a region in which no specimen is present, for example, a glass region of a slide glass which holds the specimen or the like.

The image processing device 40 is a means for performing image analysis to be described later on the pathological stained image input thereto. The image processing device 40 is formed of, for example, a well-known computer, microcomputer or the like including an arithmetic device, a control device, a storage device, an input device, and an output device. Note that the computer may be a personal computer or a server.

The image processing device 40 also includes a dye concentration image generating module 42, a dye concentration image correcting module 44, a pathological stained image regenerating module 46, and a specific region extracting module 48.

Note that these modules may be realized as programs which may be executed by the image processing device 40.

In the pathological diagnosis assistance system 10 configured in this manner, the imaging means 30 captures the pathological stained image of the specimen stained by the specimen staining means 20, and the captured pathological stained image is input to the image processing device 40, so that the image processing device 40 extracts a cell nucleus region from the pathological stained image of the specimen in the flow illustrated in FIG. 3.

First, the image processing device 40 separates the input pathological stained image into dye concentration images of respective staining dyes in the dye concentration image generating module 42. In this embodiment, the pathological stained image is separated into three types of dye concentration images: an H concentration image, a DAB concentration image, and a concentration image of other components.

Herein, a color deconvolution method using a dye base which is a conventionally known method may be used for separating into the dye concentration images. As a result, it is possible to generate the dye concentration image equivalent to that captured under an equivalent imaging condition by using different dye bases for the pathological stained images captured under different imaging conditions for each specimen.

Next, the image processing device 40 uses the dye concentration image to perform concentration correction by image processing for emphasizing a specific region in the dye concentration image correcting module 44. In this embodiment, an emphasizing process of the first stained region (cell nucleus region) is performed.

Specifically, it is possible to perform the emphasizing process of the first stained region by performing following arithmetic operation by using a first staining dye concentration image based on the first staining dye which stains the first stained region being the specific region and a second staining dye concentration image based on the second staining dye which stains the second stained region being a non-specific region.

The image processing device 40 may remove overlap of DAB from a region multi-stained with H and DAB by performing arithmetic operation (subtracting process) as in following equation (1), thereby sharpening an H region included in a DAB region in the dye concentration image correcting module 44.

[Equation 3]

$$C_{DAB}(x,y) \leftarrow C_{DAB}(x,y) - \alpha C_H(x,y) \qquad (1)$$

Herein, x and y represent a position on the dye concentration image, $C_H$ represents an H concentration value, $C_{DAB}$ represents a DAB concentration value, and $\alpha$ represents a predetermined correction coefficient.

In this manner, by performing the subtracting process proportional to a first staining dye concentration in the same position on the second stained region, the first staining dye concentration in the multi-stained region is relatively emphasized, and as a result, the multi-stained region is easily discriminated.

Then, the image processing device 40 may generate a corrected pathological stained image by performing convolution of a corrected DAB concentration image, the H concentration image, and the concentration image of other components in the pathological stained image regenerating module 46.

FIG. 4 is an image illustrating an example when dye concentration correction is performed by the subtracting process described above on the pathological stained image.

Figure 4A:
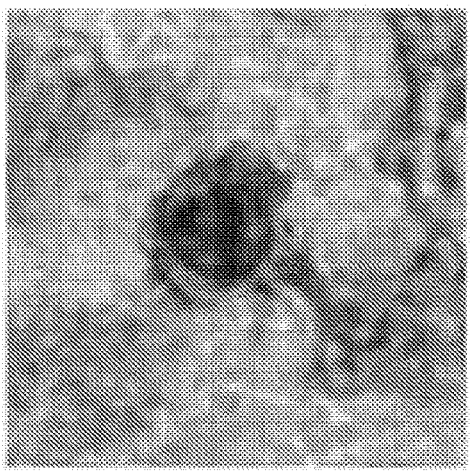
FIG. 4 is an image illustrating an example when dye concentration correction is performed on a pathological stained image.
Figure 4B:
Figure 4C:
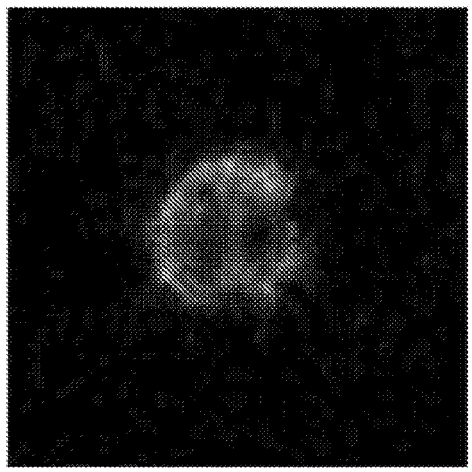

FIG. 4A illustrates the pathological stained image input to the image processing device 40. Note that, although the pathological stained image is usually a color image, this is illustrated as a grayscale image for convenience. This is separated into respective dye concentration images in the dye concentration image generating module 42. FIG. 4B illustrates the H concentration image, and FIG. 4C illustrates the DAB concentration image.

Figure 4D:
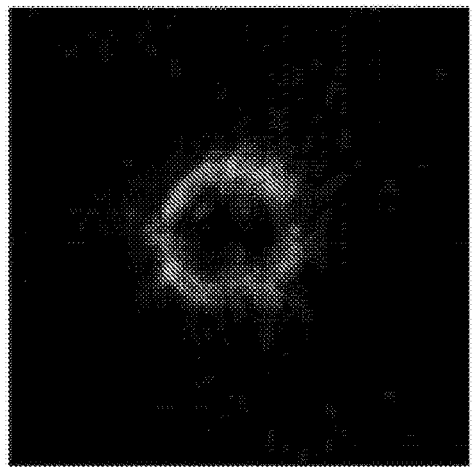

The dye concentration image correcting module 44 uses the H concentration image and the DAB concentration image to perform the arithmetic operation of equation (1) described above. In this embodiment, the arithmetic operation was performed while setting $\alpha$=0.5. FIG. 4D illustrates the corrected DAB concentration image.

Figure 4E:
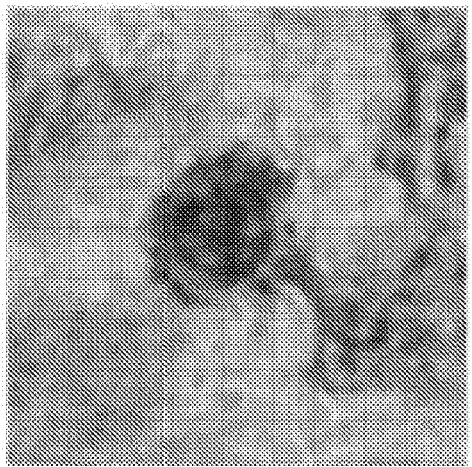

Then, by performing convolution of the H concentration image illustrated in FIG. 4B, the corrected DAB concentration image illustrated in FIG. 4D, and the concentration image of other components not illustrated, the pathological stained image in which the first stained region in the multi-stained region is sharpened is generated. FIG. 4E illustrates the corrected pathological stained image.

The image processing device 40 may emphasize a region stained with H in the H concentration image by performing arithmetic operation (adding process) as in following equation (2), thereby sharpening the H region included in the DAB region in the dye concentration image correcting module 44.

[Equation 4]

$$C_H(x,y) \leftarrow C_H(x,y) + \beta C_H(x,y) C_{DAB}(x,y) \qquad (2)$$

Herein, x and y represent the position on the dye concentration image, $C_H$ represents the H concentration value, $C_{DAB}$ represents the DAB concentration value, and $\beta$ represents a predetermined correction coefficient.

In this manner, by performing, on the first stained region, the adding process proportional to a product of its own staining dye concentration and a second staining dye concentration in the same position, the first staining dye concentration in the multi-stained region is relatively emphasized, and as a result, the multi-stained region is easily discriminated.

Then, the image processing device 40 may generate the corrected pathological stained image as illustrated in FIG. 4E by performing color convolution of the corrected H concentration image, the DAB concentration image, and the concentration image of other components in the pathological stained image regenerating module 46. Note that, although the corrected pathological stained image is usually a color image, this is illustrated as a grayscale image for convenience.

FIG. 5 is an image illustrating an example when the dye concentration correction is performed by the adding process described above on the pathological stained image.

Figure 5A:
FIG. 5 is an image illustrating another example when the dye concentration correction is performed on the pathological stained image.
Figure 5B:

FIG. 5A illustrates the pathological stained image input to the image processing device 40. Note that, although the pathological stained image is usually a color image, this is illustrated as a grayscale image for convenience. This is separated into respective dye concentration images in the dye concentration image generating module 42. FIG. 5B illustrates the H concentration image, and FIG. 5C illustrates the DAB concentration image.

The dye concentration image correcting module 44 uses the H concentration image and the DAB concentration image to perform the arithmetic operation of equation (2) described above. In this embodiment, the arithmetic operation is performed while setting $\beta$=0.75. FIG. 5D illustrates the corrected H concentration image.

Figure 5C:
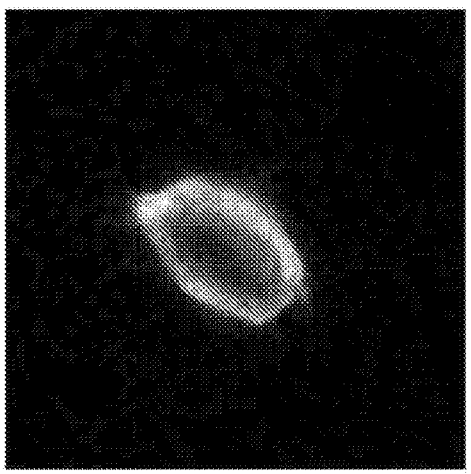
Figure 5D:
Figure 5E:
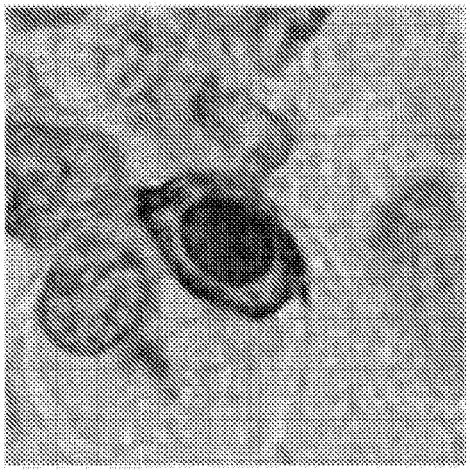

Then, by performing convolution of the corrected H concentration image illustrated in FIG. 5D, the DAB concentration image illustrated in FIG. 5C, and the concentration image of other components not illustrated, the pathological stained image in which the first stained region in the multi-stained region is sharpened is generated. FIG. 5E illustrates the corrected pathological stained image.

The image processing device 40 may also emphasize the region stained with H in the DAB concentration image by performing arithmetic operation (adding process) as in following equation (3), thereby sharpening the second stained region in the multi-stained region in the dye concentration image correcting module 44.

[Equation 5]

$$C_{DAB}(x,y) \leftarrow C_{DAB}(x,y) + \gamma C_H(x,y) \quad (3)$$

Herein, x and y represent a position on the dye concentration image, $C_H$ represents the H concentration value, $C_{DAB}$ represents the DAB concentration value, and γ represents a predetermined correction coefficient.

In this manner, by performing the adding process proportional to the first staining dye concentration in the same position on the second stained region, the second staining dye concentration in the multi-stained region is relatively emphasized, and as a result, the multi-stained region is easily discriminated.

Then, the image processing device 40 may generate the corrected pathological stained image as illustrated in FIG. 5E by performing color convolution of the corrected H concentration image, the DAB concentration image, and the concentration image of other components in the pathological stained image regenerating module 46. Note that, although the corrected pathological stained image is usually a color image, this is illustrated as a grayscale image for convenience.

The image processing device 40 may also emphasize a region stained with DAB in the H concentration image by performing arithmetic operation (subtracting process) as in following equation (4), thereby sharpening the second stained region in the multi-stained region in the dye concentration image correcting module 44.

[Equation 6]

$$C_H(x,y) \leftarrow C_H(x,y) - \delta C_H(x,y) C_{DAB}(x,y) \quad (4)$$

Herein, x and y represent a position on the dye concentration image, $C_H$ represents the H concentration value, $C_{DAB}$ represents the DAB concentration value, and δ represents a predetermined correction coefficient.

In this manner, by performing, on the first stained region, the subtracting process proportional to a product of its own staining dye concentration and the second staining dye concentration in the same position, the second staining dye concentration in the multi-stained region is relatively emphasized, and as a result, the multi-stained region is easily discriminated.

Then, the image processing device 40 may generate the corrected pathological stained image by performing color convolution of the corrected H concentration image, the DAB concentration image, and the concentration image of other components in the pathological stained image regenerating module 46.

Note that the image processing performed in the dye concentration image correcting module 44 is not limited to the above-described process, and a process for emphasizing the specific region may also be added. The predetermined correction coefficients α, β, γ, and δ in the above-described process are not especially limited, and may be appropriately changed according to, for example, legibility of an observer. Optimum values of the predetermined correction coefficients α, β, γ, and δ may also be obtained through a learning process by machine learning.

By using the corrected pathological stained image obtained in this manner, the image processing device 40 extracts the specific region based on color information specific to the staining dye which stains the specific region in the specific region extracting module 48. In this embodiment, in the corrected pathological stained image, a region in a color specific to hematoxylin which stains the cell nucleus is extracted as the cell nucleus.

Note that it is also possible to output the corrected pathological stained image to an output means such as a display and a printer, for example, without extracting the specific region from the corrected pathological stained image by the specific region extracting module 48 of the image processing device 40.

Although the preferred embodiments of the present invention are described above, the present invention is not limited thereto, and various modifications may be made without departing from the object of the present invention.

REFERENCE SIGNS LIST

10 Pathological diagnosis assistance system
20 Specimen staining means
30 Imaging means
40 Image processing device
42 Dye concentration image generating module
44 Dye concentration image correcting module
46 Pathological stained image regenerating module
48 Specific region extracting module

The invention claimed is:

1. An image processing device which emphasizes a specific region in a pathological stained image, comprising:
   a dye concentration image generating module which decomposes the pathological stained image into dye concentration images of respective staining dyes; and
   a dye concentration image correcting module which performs image processing for emphasizing the specific region by using each of the dye concentration images,
   wherein the dye concentration image correcting module corrects each of the dye concentration images by amplifying information on a dye which stains the specific region or eliminating information on a dye which stains a region other than the specific region, the amplifying or eliminating is performed in consideration of overlap of staining.

2. The image processing device according to claim 1,
   wherein the dye concentration image generating module generates each of the dye concentration images by a color deconvolution method based on a dye base.

3. The image processing device according to claim 1,
   wherein the dye concentration image generating module decomposes into the plurality of dye concentration images at least including:
   a first staining dye concentration image based on a first staining dye which stains the specific region in the pathological stained image; and
   a second staining dye concentration image based on a second staining dye which stains a non-specific region in the pathological stained image.

4. The image processing device according to claim 3,
   wherein the dye concentration image correcting module performs, on the second staining dye concentration image, a subtracting process of a product of a dye concentration of the first staining dye concentration image in the same position and a predetermined correction coefficient, thereby correcting the second staining dye concentration image.

5. The image processing device according to claim 3,
   wherein the dye concentration image correcting module performs, on the first staining dye concentration image, an adding process of a product of a dye concentration of the first staining dye concentration image, a dye concentration of the second staining dye concentration image in the same position, and a predetermined correction coefficient, thereby correcting the first staining dye concentration image.

6. The image processing device according to claim 3, wherein the dye concentration image correcting module performs, on the second staining dye concentration image, an adding process of a product of a dye concentration of the first staining dye concentration image in the same position and a predetermined correction coefficient, thereby correcting the second staining dye concentration image.

7. The image processing device according to claim 3, wherein the dye concentration image correcting module performs, on the first staining dye concentration image, a subtracting process of a product of a dye concentration of the first staining dye concentration image, a dye concentration of the second staining dye concentration image in the same position, and a predetermined correction coefficient, thereby correcting the first staining dye concentration image.

8. The image processing device according to claim 4, wherein the predetermined correction coefficient is an optimum value obtained through a learning process by machine learning.

9. The image processing device according to claim 1, further comprising:
a pathological stained image regenerating module which generates a corrected pathological stained image based on each of the dye concentration images corrected by the dye concentration image correcting module.

10. The image processing device according to claim 9, further comprising:
a specific region extracting module which extracts the specific region based on color information specific to a staining dye which stains the specific region from the corrected pathological stained image generated by the pathological stained image regenerating module.

11. A pathological diagnosis assistance system comprising:
a specimen staining part which stains a specimen to be diagnosed;
an imager which captures a pathological stained image of the stained specimen; and
the image processing device according to claim 1.

12. An image processing method of emphasizing a specific region in a pathological stained image, comprising:
decomposing the pathological stained image into dye concentration images of respective staining dyes; and
performing image processing for emphasizing the specific region by using each of the dye concentration images,
wherein the performing corrects each of the dye concentration images by amplifying information on a dye which stains the specific region or eliminating information on a dye which stains a region other than the specific region, the amplifying or eliminating is performed in consideration of overlap of staining.

13. The image processing method according to claim 12, wherein the decomposing generates each of the dye concentration images by a color deconvolution method based on a dye base.

14. The image processing method according to claim 12, wherein the decomposing decomposes into the plurality of dye concentration images at least including:
a first staining dye concentration image based on a first staining dye which stains the specific region in the pathological stained image; and
a second staining dye concentration image based on a second staining dye which stains a non-specific region in the pathological stained image.

15. The image processing method according to claim 14, wherein the performing performs, on the second staining dye concentration image, a subtracting process of a product of a dye concentration of the first staining dye concentration image in the same position and a predetermined correction coefficient, thereby correcting the second staining dye concentration image.

16. The image processing method according to claim 14, wherein the performing performs, on the first staining dye concentration image, an adding process of a product of a dye concentration of the first staining dye concentration image, a dye concentration of the second staining dye concentration image in the same position, and a predetermined correction coefficient, thereby correcting the first staining dye concentration image.

17. The image processing method according to claim 14, wherein the performing performs, on the second staining dye concentration image, an adding process of a product of a dye concentration of the first staining dye concentration image in the same position and a predetermined correction coefficient, thereby correcting the second staining dye concentration image.

18. The image processing method according to claim 14, wherein the performing performs, on the first staining dye concentration image, a subtracting process of a product of a dye concentration of the first staining dye concentration image, a dye concentration of the second staining dye concentration image in the same position, and a predetermined correction coefficient, thereby correcting the first staining dye concentration image.

19. The image processing method according to claim 15, wherein the predetermined correction coefficient is an optimum value obtained through a learning process by machine learning.

20. The image processing device according to claim 2, wherein the dye concentration image generating module decomposes into the plurality of dye concentration images at least including:
a first staining dye concentration image based on a first staining dye which stains the specific region in the pathological stained image; and
a second staining dye concentration image based on a second staining dye which stains a non-specific region in the pathological stained image.

* * * * *